(12) United States Patent
de Brébisson et al.

(10) Patent No.: US 11,651,157 B2
(45) Date of Patent: May 16, 2023

(54) FILLER WORD DETECTION THROUGH TOKENIZING AND LABELING OF TRANSCRIPTS

(71) Applicant: Descript, Inc., San Francisco, CA (US)

(72) Inventors: Alexandre de Brébisson, Montréal (CA); Antoine d'Andigné, Paris (FR)

(73) Assignee: Descript, Inc., San Francisco, CA (US)

( * ) Notice: Subject to any disclaimer, the term of this patent is extended or adjusted under 35 U.S.C. 154(b) by 122 days.

(21) Appl. No.: 17/094,533

(22) Filed: Nov. 10, 2020

(65) Prior Publication Data

US 2022/0036004 A1 Feb. 3, 2022

Related U.S. Application Data

(60) Provisional application No. 63/058,363, filed on Jul. 29, 2020.

(51) Int. Cl.
*G06F 40/284* (2020.01)
*G10L 15/26* (2006.01)
(Continued)

(52) U.S. Cl.
CPC .......... *G06F 40/284* (2020.01); *G06F 40/166* (2020.01); *G06F 40/205* (2020.01);
(Continued)

(58) Field of Classification Search
CPC .... G06F 40/284; G06F 40/166; G06F 40/205; G06F 40/221; G06F 40/253; G06F 40/263; G10L 15/26
See application file for complete search history.

(56) References Cited

U.S. PATENT DOCUMENTS 6,161,087 A * 12/2000 Wightman .............. G10L 15/26
 704/215
6,195,634 B1 2/2001 Dudemaine et al.
(Continued)

OTHER PUBLICATIONS

Lease, Matthew, Mark Johnson, and Eugene Charniak. "Recognizing disfluencies in conversational speech." IEEE Transactions on Audio, Speech, and Language Processing 14.5 (2006): 1566-1573. https://ieeexplore.ieee.org/abstract/document/1677977 (Year: 2006).*

(Continued)

*Primary Examiner* — Pierre Louis Desir
*Assistant Examiner* — Keisha Y. Castillo-Torres
(74) *Attorney, Agent, or Firm* — Perkins Coie LLP; Andrew T. Pettit

(57) ABSTRACT

Introduced here are computer programs and associated computer-implemented techniques for discovering the presence of filler words through tokenization of a transcript derived from audio content. When audio content is obtained by a media production platform, the audio content can be converted into text content as part of a speech-to-text operation. The text content can then be tokenized and labeled using a Natural Language Processing (NLP) library. Tokenizing/labeling may be performed in accordance with a series of rules associated with filler words. At a high level, these rules may examine the text content (and associated tokens/labels) to determine whether patterns, relationships, verbatim, and context indicate that a term is a filler word. Any filler words that are discovered in the text content can be identified as such so that appropriate action(s) can be taken.

14 Claims, 14 Drawing Sheets

(51) Int. Cl.
  *G06F 40/205* (2020.01)
  *G06F 40/253* (2020.01)
  *G06F 40/166* (2020.01)
  *G06F 40/263* (2020.01)
  *G06F 40/221* (2020.01)

(52) U.S. Cl.
  CPC .......... *G06F 40/221* (2020.01); *G06F 40/253* (2020.01); *G06F 40/263* (2020.01); *G10L 15/26* (2013.01)

(56) References Cited

U.S. PATENT DOCUMENTS

| | | |
|---|---|---|
| 7,010,489 B1 | 3/2006 | Lewis et al. |
| 2006/0136352 A1 | 6/2006 | Brun et al. |
| 2007/0244702 A1 | 10/2007 | Kahn et al. |
| 2008/0046229 A1 | 2/2008 | Maskey et al. |
| 2011/0276577 A1 | 11/2011 | Yao et al. |
| 2016/0086601 A1 | 3/2016 | Chotimongkol et al. |
| 2016/0173431 A1 | 6/2016 | Harpur et al. |
| 2020/0074002 A1 | 3/2020 | Kalia et al. |
| 2020/0111386 A1* | 4/2020 | Scholz .................... G10L 15/22 |
| 2021/0004437 A1* | 1/2021 | Zhang .................... G06F 40/205 |
| 2021/0182902 A1* | 6/2021 | Scott-Green ........... G06N 20/00 |
| 2022/0012296 A1* | 1/2022 | Marey ................. G06F 16/9538 |

OTHER PUBLICATIONS

Snover, Matthew, et al., Snover, et al., "A lexically-driven algorithm for disfluency detection," Proceedings of HLT-NAACL 2004: Short Papers, 2004, pp. 1-4.

\* cited by examiner

Storage Space 314

FILLER WORD DETECTION THROUGH TOKENIZING AND LABELING OF TRANSCRIPTS

CROSS-REFERENCE TO RELATED APPLICATIONS

This application claims priority to U.S. Provisional Application No. 63/058,363, titled "Filler Word Detection Through Tokenizing and Labeling of Transcripts" and filed on Jul. 29, 2020, which is incorporated by reference herein in its entirety.

TECHNICAL FIELD

Various embodiments concern computer programs and associated computer-implemented techniques for processing audio content to be converted into text content.

BACKGROUND

Digital audio workstations (DAWs) are designed for recording and/or producing audio files, such as songs, speech, and sound effects. DAWs come in a wide variety of configurations, from a computer program executing on a computing device (e.g., a personal computer) to a highly complex configuration of hardware components that are controlled by a computing device. Those hardware components may include audio input devices (e.g., microphones) and audio output devices (e.g., speakers).

DAWs historically included a mixing console, a control surface, an audio converter, and a storage medium that were located in a single computing device. These hardware-implemented DAWs were more popular before personal computers became powerful enough to run the resource-intensive software needed to edit audio files.

Now, the term "DAW" may simply refer to editing-focused computer programs. A computing device capable of executing one of these computer programs will normally include either a sound card or an audio interface, as well as at least one input component for modifying the audio files. Examples of input components include computer mice, MIDI keyboards (also referred to as "controller keyboards"), automated fader boards for mixing track volumes, and the like. The computing device can act as a host for the sound card or the audio interface, while the computer program can provide the interfaces (and support the functionalities) through which audio files can be edited. While these software-implemented DAWs have extensive recording, editing, and playback capabilities, these DAWs are intended to be used by experts (also referred to as "audio professionals").

Figure 1:
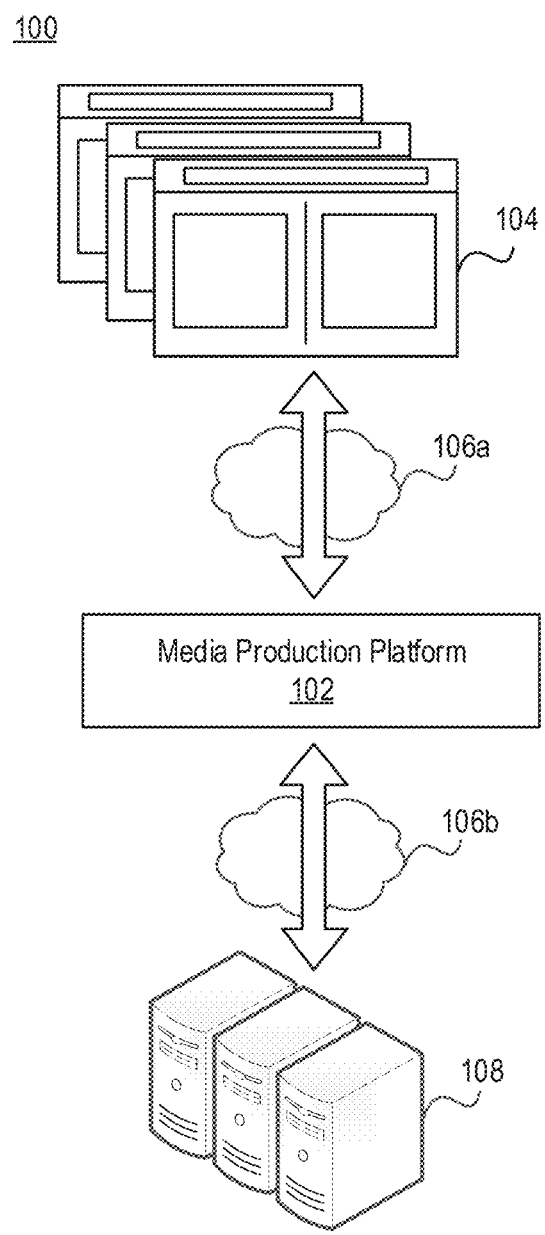
FIG. 1 illustrates a network environment that includes a media production platform responsible for creating the interfaces through which individuals can produce media content.

Various features of the technology described herein will become more apparent to those skilled in the art from a study of the Detailed Description in conjunction with the drawings. Embodiments are illustrated by way of example and not limitation in the drawings. While the drawings depict various embodiments for the purpose of illustration, those skilled in the art will recognize that alternative embodiments may be employed without departing from the principles of the technology. Accordingly, while specific embodiments are shown in the drawings, the technology is amenable to various modifications.

DETAILED DESCRIPTION

The term "speech recognition" refers to an interdisciplinary field of computational linguistics concerned with the methodologies/technologies related to the translation of spoken language into text. Some speech recognition systems (also referred to as "speech-to-text (STT) systems") require training, where a speaker reads text and/or isolated vocabulary into the system. Such systems will analyze these samples to fine-tune its ability to recognize the speech uttered by the speaker, thereby resulting in increased accuracy. Speech recognition systems that require training are referred to as "speaker-dependent systems," while speech recognition systems that do not require training are called "speaker-independent systems."

Speech recognition can be applied in a variety of different contexts, including voice dialing, call routing, domotic appliance control, search, data entry, and the like. For example, speech recognition has become popular in the context of word processing programs (also referred to as "word processors"). The term "word processor," as used herein, refers to a computer program that is able to provide for inputting, editing, formatting, and outputting of text. U.S. Pat. No. 10,445,052, titled "Platform for Producing and Delivering Media Content" and incorporated by reference herein in its entirety, illustrates how text generated through speech recognition may be examined through a word processor as part of a content develop process.

Despite significant improvements in speech recognition, STT systems still struggle to accurately convert some speech into text. Speech disfluencies can play a significant role in these struggles. The term "speech disfluency," as used herein, refers to breaks, irregularities, and non-lexical vocables that occur within the flow of otherwise fluent speech. These include "false starts" (i.e., words or phrases that are cut off mid-utterance), repeated phrases/words/syllables, and filler words. Filler words (also referred to as "fillers") include grunts and non-lexical utterances such as "huh," "uh," "erm," "um," "well," "so," "like," and "hmm." One reason that STT systems struggle with speech disfluencies—and especially filler words—is that such systems are not properly trained to transcribe speech disfluencies. Moreover, filler words are often accompanied by hesitations that make transcription more challenging, and some terms (e.g., "so" and "like") may be filler words in some situations and non-filler words in other situations.

Introduced here are computer programs and associated computer-implemented techniques for discovering the presence of filler words through tokenization of text content (also referred to as "text data"). This text data may be associated with, or derived from, audio content (also referred to as "audio data"). As an example, when an audio file is obtained by a media production platform, the audio file can be converted into a transcript as part of a speech-to-text operation. The transcript can then be tokenized and labeled using a Natural Language Processing (NLP) library. One example of an NLP library is spaCy. Tokenizing and labeling may be performed in accordance with a series of rules associated with different filler words. At a high level, these rules may examine the transcript (and associated tokens/labels) to determine whether patterns, relationships (e.g., as determined from part-of-speech tagging, dependency parsing, etc.), verbatim, and context indicate that a given term is a filler word. Any filler words that are discovered in the transcript can be identified as such so that appropriate action(s) can be taken. Note that while embodiments may be described in the context of transcripts for the purpose of illustration, those skilled in the art will recognize that the technology is similarly applicable to other forms of text data. Other examples of text data include reviews, surveys, evaluations, posts (e.g., on social media platforms), books, and news articles.

As further discussed below, the media production platform may be able to generate interfaces through which individuals (also referred to as "users" or "developers") can create, edit, or view media content. The audio and text data may be used in the production of this media content. Accordingly, the technologies described herein may be used to facilitate the editing of text data, audio data, or video data. For example, the media production platform may be embodied as a word processor that allows individuals to edit voice-based audio data by editing a transcript, and vice versa.

Several of the interfaces discussed herein allow different media formats (e.g., audio data and text data) to be aligned for post-processing. To facilitate post-processing, the media production platform may dynamically link files associated with different media formats to one another. Such an approach allows edits to be more easily carried throughout the files. For example, when an individual modifies a transcript corresponding to an audio file (e.g., by removing a term identified as a filler word, or by copying and then pasting a segment of the transcript to a different location), the media production platform may cause the modification to be reflected globally. That is, the media production platform may cause similar or identical modifications to be made to the audio file.

Embodiments may be described with reference to particular computer programs, networks, content, etc. However, those skilled in the art will recognize that these features are equally applicable to other types of computer programs, networks, content, etc. For example, while embodiments may be described in the context of a computer program implemented on a network-accessible server system, the relevant features may be similarly applicable to computer programs implemented on computing devices such as mobile phones, tablet computers, or personal computers. As another example, while embodiments may be described in the context of processing audio content and/or text content to be used in the production of media content, the relevant features may have other applications.

Note that while embodiments may be described in the context of computer-executable instructions for the purpose of illustration, aspects of the technology can be implemented via hardware, firmware, or software. As an example, a media production platform may be embodied as a computer program operable to review audio content to be incorporated into a media compilation, examine text content (e.g., transcripts) associated with the audio content, and review labels appended to the text content to determine whether modifications of the audio content or text content are necessary.

Terminology

References in this description to "an embodiment" or "one embodiment" means that the feature, function, structure, or characteristic being described is included in at least one embodiment of the technology. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The terms "connected," "coupled," or any variant thereof is intended to include any connection or coupling between two or more elements, either direct or indirect. The connection/coupling can be physical, logical, or a combination thereof. For example, objects may be electrically or communicatively coupled to one another despite not sharing a physical connection.

The term "module" refers broadly to software components, firmware components, and/or hardware components. Modules are typically functional components that generate output(s) based on specified input(s). A computer program may include one or more modules. Thus, a computer program may include multiple modules responsible for completing different tasks or a single module responsible for completing all tasks.

When used in reference to a list of multiple items, the term "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here.

Similarly, steps could be replaced or reordered. Thus, descriptions of any processes are intended to be open-ended.

Overview of Media Production Platform

FIG. 1 illustrates a network environment 100 that includes a media production platform 102. Individuals can interact with the media production platform 102 via interfaces 104 as further discussed below. For example, individuals may be able to generate, edit, or view media content (or simply "media") through the interfaces 104. Examples of media include text content such as stories and articles, audio content such as radio segments and podcasts, and video content such as television programs and presentations. Meanwhile, the individuals may be persons interested in recording media (e.g., audio content), editing media (e.g., to create a podcast or an audio tour), etc.

As shown in FIG. 1, the media production platform 102 may reside in a network environment 100. Thus, the computing device on which the media production platform 102 is executing may be connected to one or more networks 106a-b. The network(s) 106a-b can include personal area networks (PANs), local area networks (LANs), wide area networks (WANs), metropolitan area networks (MANs), cellular networks, the Internet, etc. Additionally or alternatively, the computing device can be communicatively coupled to other computing device(s) over a short-range wireless connectivity technology, such as Bluetooth®, Near Field Communication (NFC), Wi-Fi® Direct (also referred to as "Wi-Fi P2P"), and the like. As an example, the media production platform 102 is embodied as a "cloud platform" that is at least partially executed by a network-accessible server system in some embodiments. In such embodiments, individuals may access the media production platform 102 through computer programs executing on their own computing devices. For example, an individual may access the media production platform 102 through a mobile application, desktop application, over-the-top (OTT) application, or web browser. Accordingly, the interfaces 104 may be viewed on personal computers, tablet computers, mobile phones, wearable electronic devices (e.g., watches or fitness accessories), network-connected ("smart") electronic devices (e.g., televisions or home assistant devices), gaming consoles, or virtual/augmented reality systems (e.g., head-mounted displays).

In some embodiments, at least some components of the media production platform 102 are hosted locally. That is, part of the media production platform 102 may reside on the computing device used to access the interfaces 104. For example, the media production platform 102 may be embodied as a desktop application executing on a personal computer. Note, however, that the desktop application may be communicatively connected to a network-accessible server system 108 on which other components of the media production platform 102 are hosted.

In other embodiments, the media production platform 102 is executed entirely by a cloud computing service operated by, for example, Amazon Web Services® (AWS), Google Cloud Platform™, or Microsoft Azure®. In such embodiments, the media production platform 102 may reside on a network-accessible server system 108 comprised of one or more computer servers. These computer servers can include media and other assets, such as processing operations, heuristics (e.g., rules) for labeling the media, and the like. Those skilled in the art will recognize that this information could also be distributed amongst a network-accessible server system and one or more computing devices. For example, media may be stored on a personal computer that is used by an individual to access the interfaces 104 (or another computing device, such as a storage medium, accessible to the personal computer) while processing operations may be stored on a computer server that is accessible to the personal computer via a network.

As further discussed below, the media production platform 102 can facilitate transcript-driven production of media. The individual may be able to alter an audio file by modifying a corresponding transcript that is viewable through one of the interfaces 104, or vice versa. For example, if the individual inserts an audio file into a transcript, the media production platform 102 may cause the audio file to be added to the underlying audio file corresponding to the transcript.

Moreover, the media production platform 102 may be able to automatically modify media on behalf of the individual. Thus, the media production platform 102 could create and/or modify a timeline that is associated with a media-based experience (also referred to as a "content-based experience") based on implicit actions and/or explicit actions of a person participating in the experience (also referred to as a "consumer"). For example, the media production platform 102 may intelligently add, remove, or modify media in a guided audio tour as a consumer progresses through the guided audio tour. Other examples of media-based experiences include audiobooks, presentations, radio segments, video segments, video games, and the like.

Figure 2:
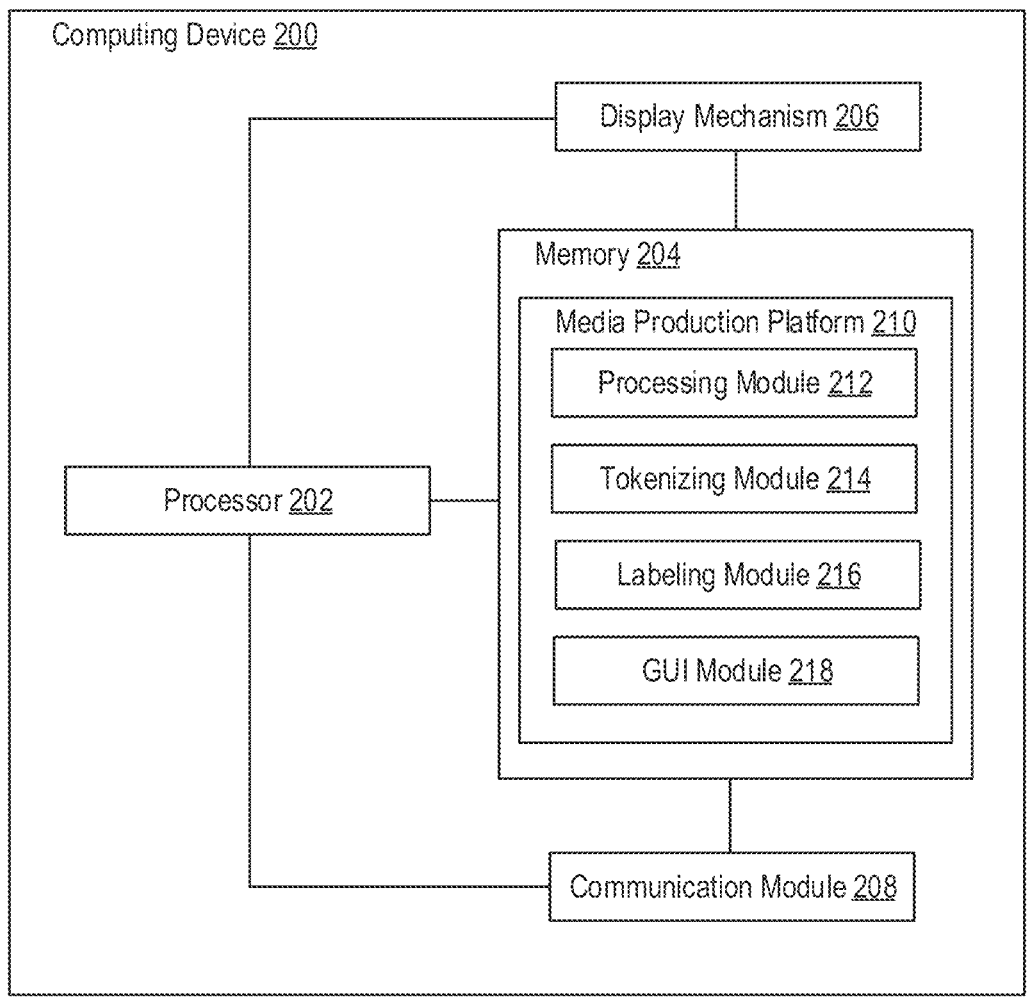
FIG. 2 illustrates an example of a computing device able to implement a media production platform through which individuals may be able to record, produce, deliver, or consume media content.

FIG. 2 illustrates an example of a computing device 200 able to implement a media production platform 210 through which individuals may be able to record, produce, deliver, or consume media content. For example, in some embodiments the media production platform 210 is designed to generate interfaces through which developers can generate or produce media content, while in other embodiments the media production platform 210 is designed to generate interfaces through which consumers can consume media content. In some embodiments, the media production platform 210 is embodied as a computer program that is executed by the computing device 200. In other embodiments, the media production platform 210 is embodied as a computer program that is executed by another computing device (e.g., a computer server) to which the computing device 200 is communicatively connected. In such embodiments, the computing device 200 may transmit relevant information, such as media recorded or obtained by the individual, to the other computing device for processing. Those skilled in the art will recognize that aspects of the computer program could also be distributed amongst multiple computing devices.

The computing device 200 can include a processor 202, memory 204, display mechanism 206, and communication module 208. The communication module 208 may be, for example, wireless communication circuitry designed to establish communication channels with other computing devices. Examples of wireless communication circuitry include integrated circuits (also referred to as "chips") configured for Bluetooth, Wi-Fi, NFC, and the like. The processor 202 can have generic characteristics similar to general-purpose processors, or the processor 202 may be an application-specific integrated circuit (ASIC) that provides control functions to the computing device 200. As shown in FIG. 2, the processor 202 can be coupled to all components of the computing device 200, either directly or indirectly, for communication purposes.

The memory 204 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 202, the memory 204 can also store data generated by the processor 202 (e.g., when executing the modules of the media production platform 210). Note that the memory 204 is merely an abstract representation of a storage environment. The memory 204 could be comprised of actual memory chips or modules.

The communication module 208 can manage communications between the components of the computing device 200. The communication module 208 can also manage communications with other computing devices. Examples of computing devices include mobile phones, tablet computers, personal computers, and network-accessible server systems comprised of computer server(s). For instance, in embodiments where the computing device 200 is associated with a developer, the communication module 208 may be communicatively connected to a network-accessible server system on which processing operations, heuristics, and algorithms for producing media content are stored. In some embodiments, the communication module 208 facilitates communication with one or more third-party services that are responsible for providing specified services (e.g., transcription). The communication module 208 may facilitate communication with these third-party services through the use of application programming interfaces (APIs), bulk data interfaces, etc.

For convenience, the media production platform 210 may be referred to as a computer program that resides within the memory 204. However, the media production platform 210 could be comprised of software, firmware, and/or hardware components implemented in, or accessible to, the computing device 200. In accordance with embodiments described herein, the media production platform 210 may include a processing module 212, tokenizing module 214, labeling module 216, and graphical user interface (GUI) module 218. These modules can be an integral part of the media production platform 210. Alternatively, these modules can be logically separate from the media production platform 210 but operate "alongside" it. Together, these modules may enable the media production platform 210 to generate and then support interfaces through which media content can be recorded, edited, compiled, or consumed.

As further discussed below, the tokenizing module 214 and labeling module 216 may work in concert to tokenize and then label words/phrases in a transcript. Assume, for example, that the media production platform 210 obtains a transcript to be used in the production of a media-based experience. This transcript could be created by the processing module 212 (e.g., by applying speech recognition algorithms to audio content), received by the communication module 208 from a third-party service that provides transcription services, or acquired by the processing module 212 upon being uploaded to the media production platform 210. Initially, the tokenizing module 214 can tokenize text in the transcript to create a list of tokens. Generally, these tokens represent individual words, though the tokens could also represent phrases (also referred to as "expressions") or complete sentences. Using these tokens, the labeling module 216 can label each word in the transcript as either being indicative of a filler word or not. To label each word, the labeling module 216 may employ a series of rules, each of which may be associated with a different filler word. In some embodiments, these rules are manually programmed. For example, a developer may define the content for when a given word (e.g., "so") should be labeled as a filler word. In other embodiments, these rules are automatically or autonomously programmed. For example, to create a computer-implemented model (or simply "model") designed to discover instances of a given filler word, a developer may train the model using examples of text content in which the given filler word has been labeled. The amount of training needed may depend on the nature of the filler word. Some filler words (e.g., "um" and "hmm") will always be labeled as such, while other filler words (e.g., "so" and "like") could be used in a legitimate context. These models may be based on various machine learning and/or artificial intelligence technologies.

The GUI module 218 may be responsible for generating the interfaces through which individuals can interact with the media production platform 210. As shown in FIGS. 3A-G, these interfaces may include visual indicia representative of the audio files that make up a media-based experience, or these interfaces may include a transcript that can be edited to globally effect changes to a media-based experience. For example, if an individual deletes a segment of a transcript that is visible on an interface, the media production platform 210 may automatically delete a corresponding segment of audio content from an audio file associated with the transcript.

FIGS. 3A-G depict examples of interfaces that enable an individual to readily produce high-quality media content. These interfaces, which are created by a media production platform, may enable nearly anyone who understands how to use a word processor to produce media content that is suitable for professional applications. Moreover, the media production platform can support powerful features that can be used to create media content, incorporate consumer feedback, and ensure these interfaces are readily comprehensible and easy to use. Examples of media content include location-based experiences involving audio content and/or video content, podcasts, audiobooks, radio segments, television segments, presentations, etc. These powerful features are enabled by higher-level, content-based editing tools rather than the lower-level, waveform-based editing tools used by conventional DAWs. The media production platform may also be designed to facilitate simultaneous collaboration between multiple developers, as well as multiple consumers who may simultaneously consume media content produced by those developers.

Figure 3A:
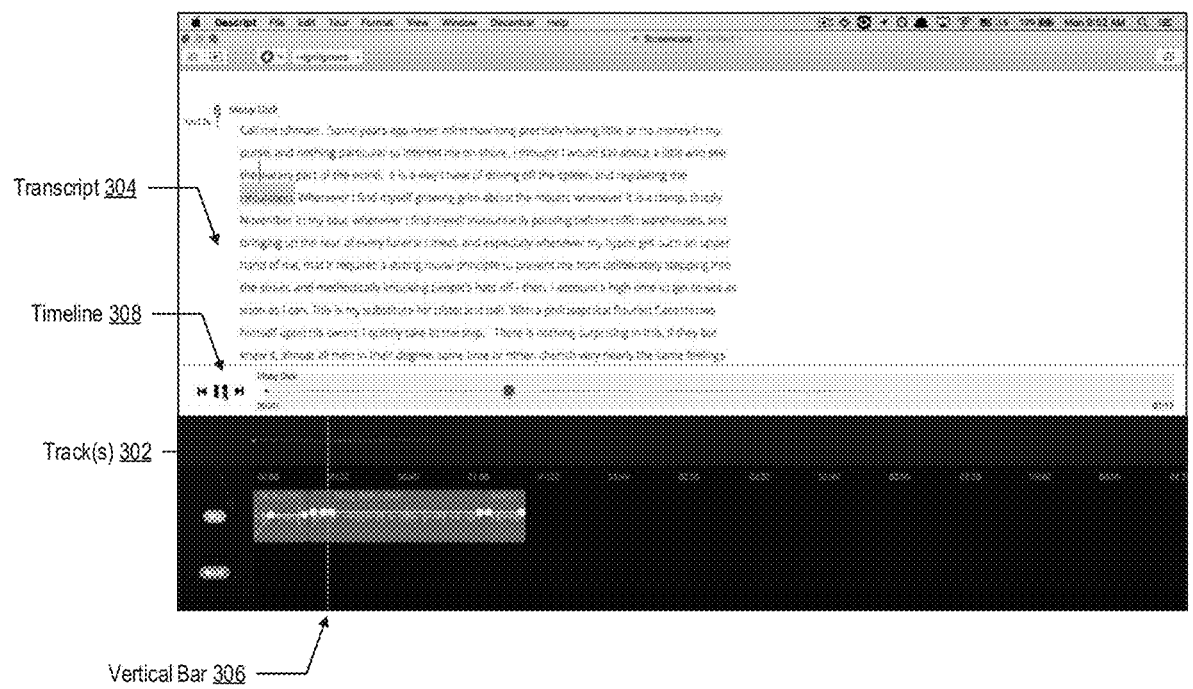
FIG. 3A depicts an example of an interface that includes multiple windows for producing media content.

As shown in FIG. 3A, an interface may include multiple windows for producing media content. Production may involve creating and/or editing media content. For example, one or more tracks 302 corresponding to audio file(s) could be presented in one window, while a transcript 304 of words recognized in the audio file(s) could be presented in another window. The track(s) 302 may be separately or collectively editable. The media production platform may also be able to intelligently switch between multiple tracks based on whether certain criteria are satisfied, much like a video game engine. For example, the media production platform may determine whether certain condition(s) are met for playing a particular audio file. As another example, the media production platform may determine whether an individual has begun editing a portion of the transcript corresponding to a particular audio file.

Interfaces with multiple windows can easily align media content for post-processing, editing, etc. Alignment can also be permitted between media content of different formats (e.g., audio and text). For example, when an individual modifies a transcript by removing a term labeled as a filler word, the media production platform may cause the change to be reflected globally. That is, the media production platform may effect an identical or similar modification to an audio file that is associated with the transcript. Such action may be performed periodically or continually. For example, the media production platform may continually monitor the transcript (or the corresponding audio file) for changes so long as available bandwidth and/or connectivity status meets a specified threshold. Should these measure(s) fall below the specified threshold, the media production platform may periodically query whether any modifications have been made to the transcript (or the corresponding audio file).

In some embodiments, visual cues are used to indicate the current position in the transcript 304 and/or the track(s) 302. Here, for example, the media production platform has highlighted the word corresponding to the current position in the transcript and created a vertical bar 306 that overlays the track(s) 302. Other examples of visual cues include underlining the word corresponding to the current position, changing the color of the word corresponding to the current position, and placing an animated feature (e.g., a moving sphere) near the word corresponding to the current position. A timeline 308 may indicate the total duration of the media content, as well as provide a visual representation of progress.

Figure 3B:
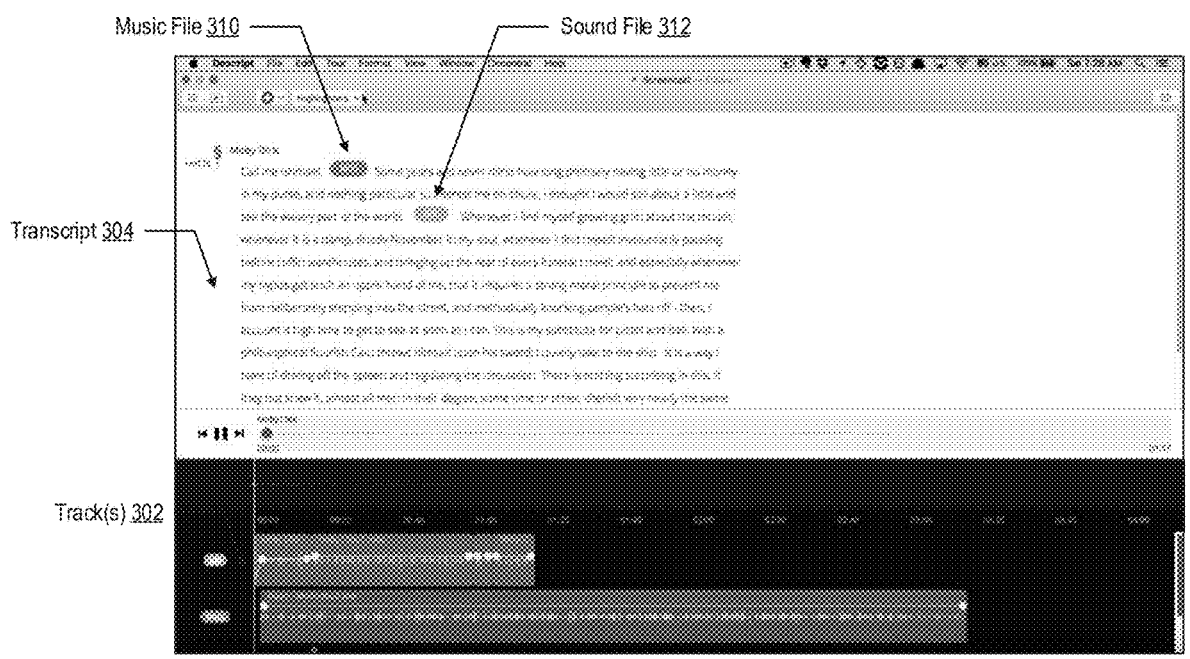
FIG. 3B depicts an example of an interface that may facilitate in-line, multi-track sequencing of the content within windows shown on the interface.

As shown in FIG. 3B, an interface may also facilitate in-line, multi-track sequencing of the media content in the windows shown on the interface. In some embodiments, all of the windows shown on the interface are dynamically linked together (e.g., on a phoneme level or a word level). In other embodiments, only some of the windows on the interface are dynamically linked together. Various mechanisms, such as a drag-and-drop mechanism, may allow audio files to be selected/placed directly where an individual would like the sound to play. Here, for example, a music file 310 has been placed in the transcript 304 such that the music will begin playing after the word "Ishmael" has been uttered. Similarly, a sound file 312 has been placed in the transcript 304 such that the sound effect will begin playing after the word "world" has been uttered.

After an audio file has been placed in the transcript 304, a waveform corresponding to the audio file may be automatically placed along one of the track(s) 302 in the waveform window. When the audio file is moved within the transcript 304 (e.g., due to being dragged from one location to another location), the media production platform can ensure that the corresponding waveform moves along the track as well. As noted above, the transcript 304 and the audio file(s) arranged along the track(s) 302 are normally synced with one another so that changes made to one can be propagated across the other by the media production platform in real time.

An individual may be able to separately edit the audio file(s) arranged along the track(s) 302 from within the waveform window. For example, the individual may be able to modify the duration of an audio file (e.g., by cutting material), set fades, and perform other operations without leaving the interface.

Figure 3C:
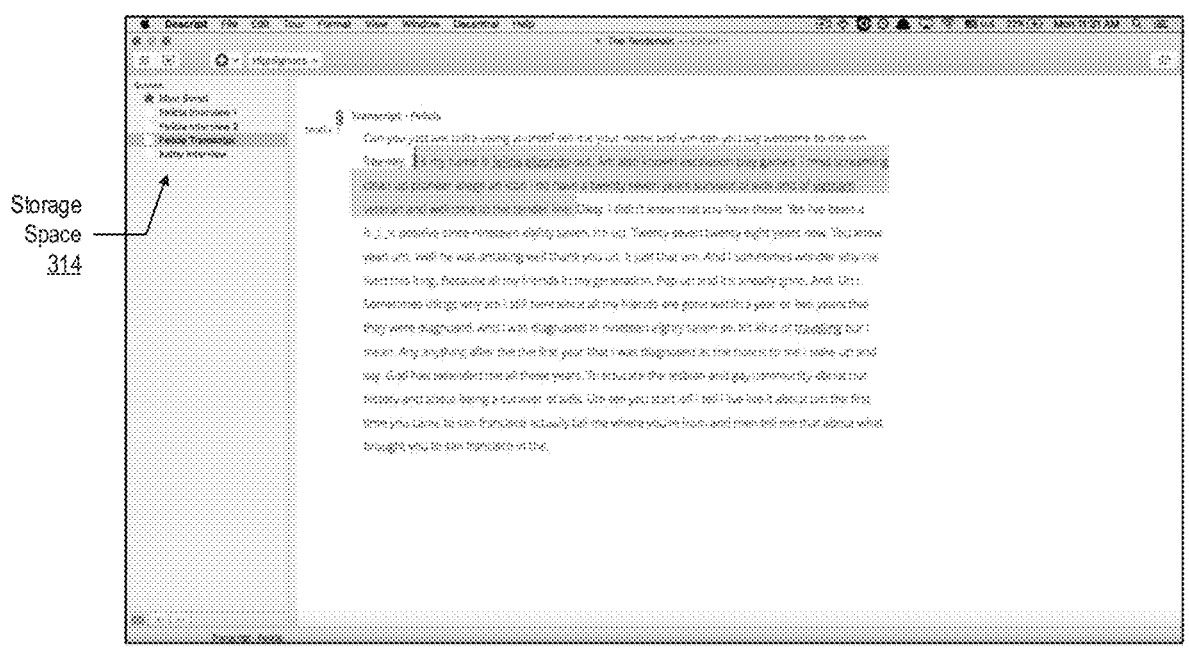
FIG. 3C illustrates how files can be stored as separate documents in a storage space.

As shown in FIG. 3C, files can be stored as separate documents within a storage space 314 (also referred to as a "workspace"). Examples of files include text files (e.g., transcripts), audio files (e.g., voiceover recordings), and video files. In some embodiments, the storage space 314 is associated with a particular project/experience. Accordingly, only those files related to the particular project/experience may be shown within the storage space 314. Here, for example, four separate files (i.e., Felicia Interview 1, Felicia Interview 2, Felicia Transcript, and Kathy Interview) are associated with a single project, namely, a guided audio tour of the Tenderloin neighborhood of San Francisco, Calif. The four separate files include three audio files (i.e., Felicia Interview 1, Felicia Interview 2, and Kathy Interview) and one text file (i.e., Felicia Transcript).

An individual could manually associate an audio file with a preexisting transcript when the audio file is uploaded to the media production platform. Alternatively, the media production platform could automatically associate an audio file with a preexisting transcript based on, for example, a comparison of words recognized in the audio file to a series of preexisting transcripts. As noted above, the media production platform may automatically generate a transcript responsive to receiving the audio file and then post the transcript to the interface for review by the individual. For example, the media production platform may create a transcript upon determining that a transcript does not already exist for an acquired audio file. If a transcript is uploaded to the media production platform (or written using the interface) and no corresponding audio file(s) exist, the media production platform may automatically generate voice-like scratch audio that can be used to test aspects of a project/experience, such as expected runtime, flow, etc.

Figure 3D:
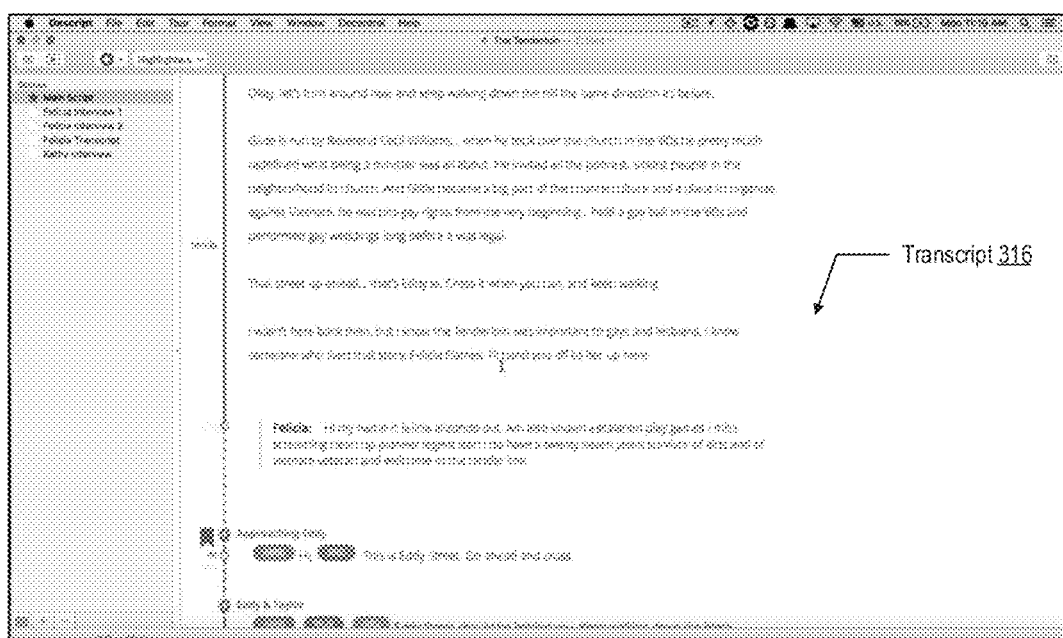
FIG. 3D illustrates how an individual can select a segment of a transcript for the purpose of altering the corresponding audio waveform.
Figure 3E:
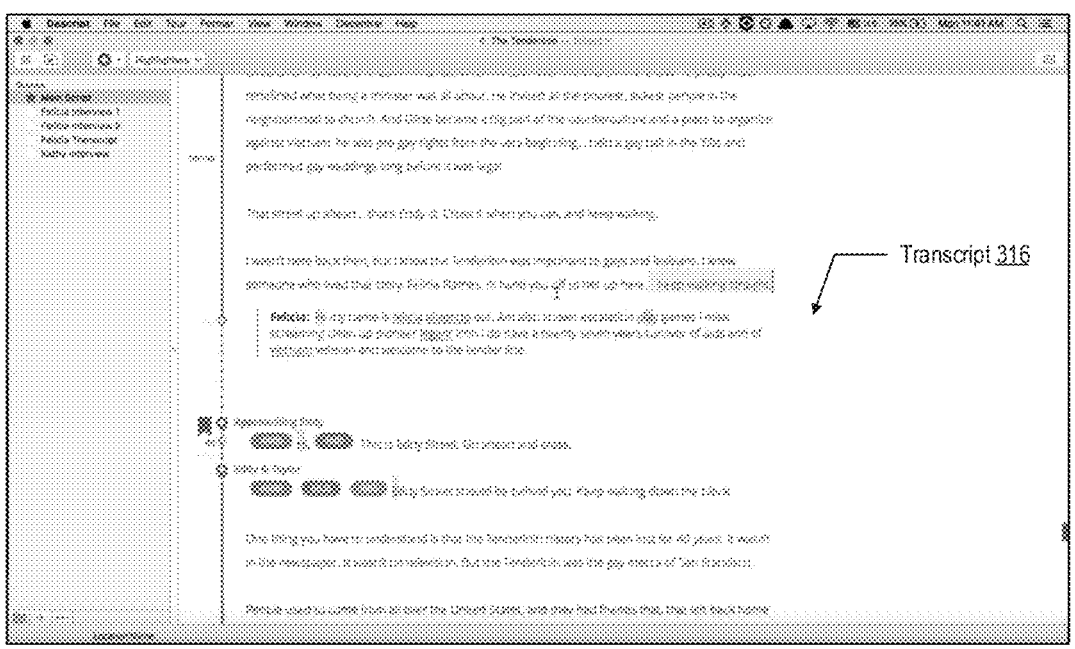
FIG. 3E illustrates how an individual can copy a segment of a transcript and then paste the copied segment into another transcript, another location in the transcript, etc.

Each file accessible to the media production platform may be independently editable using the interfaces shown in FIGS. 3A-G. However, an individual may also be able to easily switch between various files while producing a project/experience. As shown in FIGS. 3D-E, the individual could select a segment of a transcript 316 (e.g., by selecting a portion of the transcript 316 or the corresponding audio waveform), copy the segment, and then paste the segment into another transcript, another location in the transcript 316, etc.

Corresponding media content may also be transferred based on the single action performed by the individual. For example, the selection of the segment of the transcript 316 may prompt the media production platform to create an audio segment by clipping a source audio file. If the individual copies segments of a first transcript and then pastes the segments into a second transcript, corresponding portions of a first audio file associated with the first transcript may be used to form a second audio file associated with the second transcript.

Such granular modification of the text/audio is enabled by precisely aligning the transcript and corresponding audio file(s). Alignment may occur during pre-processing of the audio file(s), generating of the transcript, etc. When an audio file is provided to the media production platform (e.g., by uploading the audio file through the interface), various speech recognition processes can be performed that enable words spoken in the audio file to be converted into text.

Accordingly, the media production platform may be able to automatically align audio file(s) uploaded by an individual with a preexisting transcript by detecting the presence of certain words/phrases. These words/phrases may be referred to as "keywords" or "keyphrases" as they enable alignment to be accomplished much more easily. In some embodiments, the media production platform is able to automatically to stack multiple utterances of the same phrase upon detecting a single occurrence of the phrase in the preexisting transcript. That is, a speaker may be able to record one or more takes over a preexisting script. Multiple occurrences of the same phrase are often indicative of multiple takes of the same line of dialogue by a voice actor. The media production platform may be configured to facilitate the initiation of playback of the multiple takes, the selection of a given take, etc.

The media production platform can create a transcript based on the spoken words recognized in an audio file. Moreover, the media production platform can parse the recognized words and align the words with the corresponding portions of the audio file on a phoneme level or word level. Consequently, audio waveforms can be readily modified by the media production platform based on changes to the transcript, and vice versa. Note, however, that even if the transcript is not identical to the audio file (e.g., the transcript includes errors, or the speaker has not uttered words in the transcript), alignment can still be performed to determine a best fit for the audio file within the transcript based on context.

As shown in FIG. 3E, individuals may be able to modify the transcript 316 directly. Here, an individual has added text ("Keep walking straight.") directly into the transcript 316. In some embodiments, modifications to the transcript 316 are visually highlighted in some manner. For example, newly added text may be highlighted in a particular color to indicate that audio must still be recorded for that text. In such instances, if the individual elects to play the transcript (e.g., for testing purposes), a voice generator program may read the newly added text so as to not interrupt the flow of the media-based experience. Examples of modifications include additions of new text, removals of existing text, and changes to existing text.

Figure 3F:
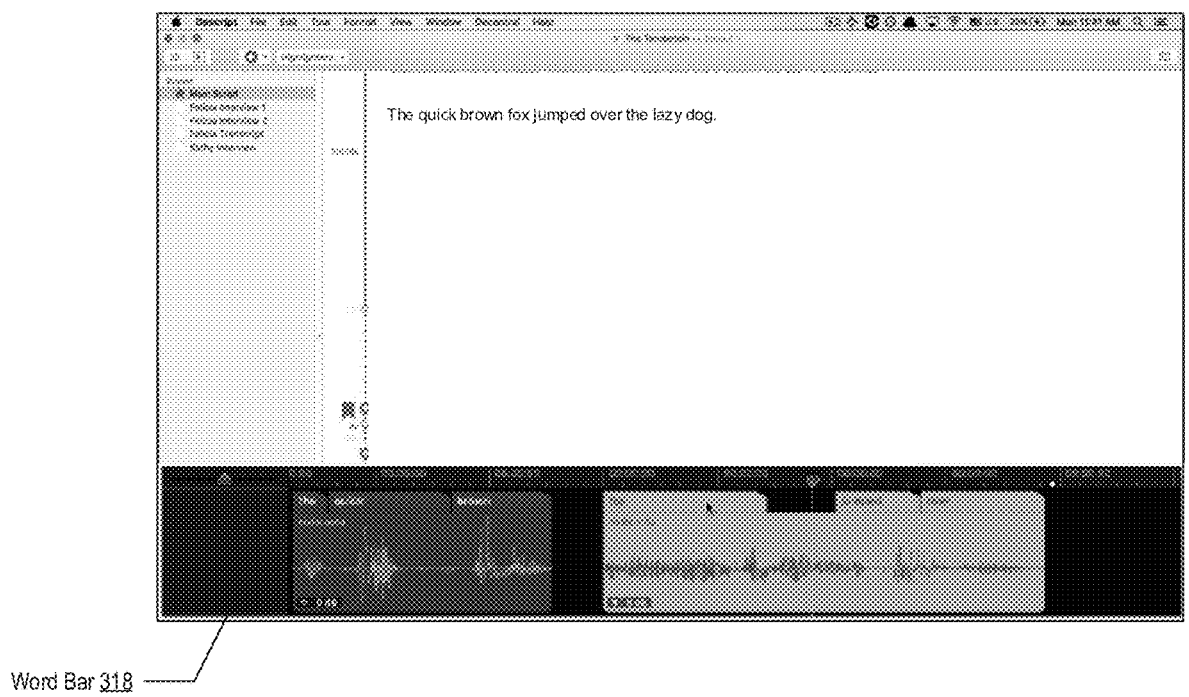
FIG. 3F depicts an example of an interface that includes a word bar, which allows an individual to directly manipulate words via a waveform editor window.

As shown in FIG. 3F, some interfaces include a word bar 318 that visually represents the individual words in an audio file. The media production platform may automatically populate the word bar 318 after parsing the audio file to recognize spoken words. Each word in the word bar 318 may be aligned with a corresponding portion of an audio waveform corresponding to the audio file and/or a timeline. Individuals may be able to directly manipulate the audio file by manipulating the word(s) in the word bar 318, eliminate gaps in the audio file by manipulating the audio waveform, create gaps in the audio file by manipulating the audio waveform, etc.

Figure 3G:
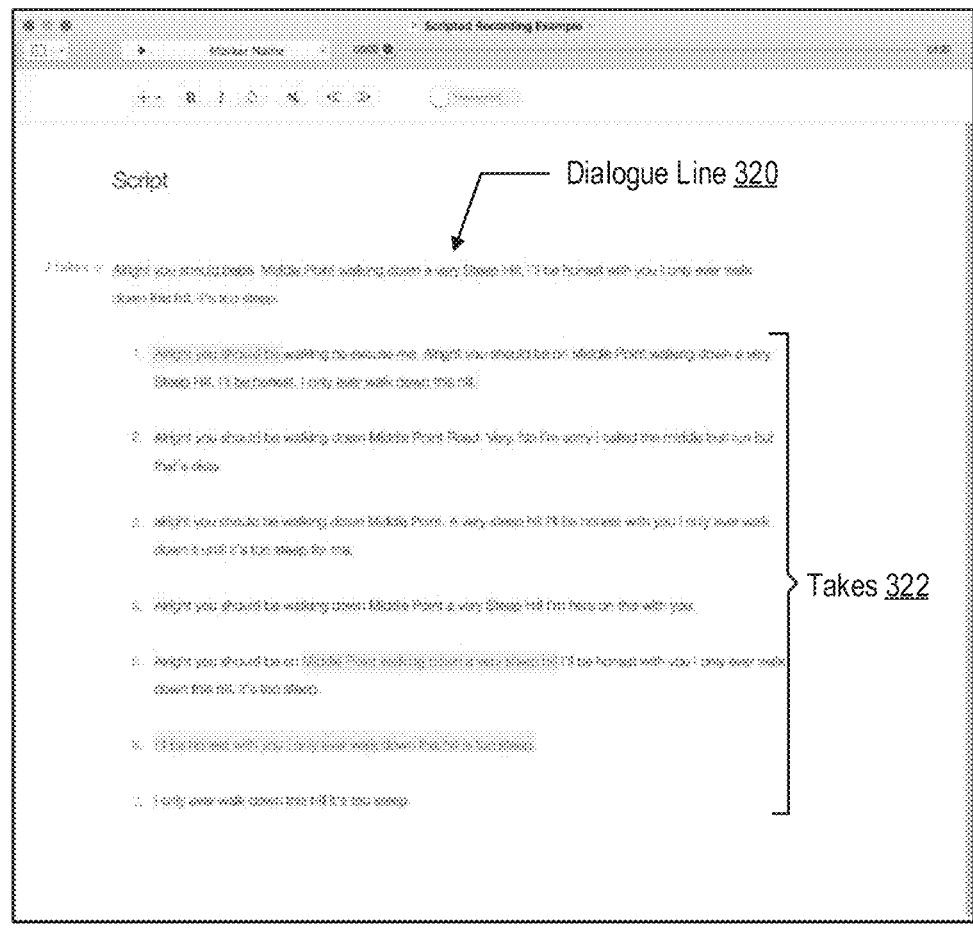
FIG. 3G illustrates how multiple voices that are simultaneously speaking in an audio recording or a video recording may be separately shown using script section blocks.

As shown in FIG. 3G, multiple voices that are simultaneously speaking in an audio file (or a video file) may be separately shown using script section blocks. Such a scenario may be referred to as "crosstalk." Multiple takes of the same line of dialogue may be displayed in a similar manner. Here, for example, there are seven different takes 322 of a line of dialogue 320. These takes 322 are contemporaneous in nature. That is, all of the takes occur at the same point in time during a media-based experience. Accordingly, a consumer of the media-based experience will likely only experience a single take. However, developers may want to see how the different takes affect flow, runtime, etc.

Playhead(s) may be used to represent position while producing, reviewing, or viewing media content. For example, in some embodiments, multiple playheads are used for those takes that share words/phrases in common. While playheads are normally illustrated as vertical lines embedded within the text, other visual indicia may be used. For example, words may be highlighted in a particular color as they are presented during playback of a take by the media production platform.

Overview of Approaches to Filler Word Detection

As discussed above, speech disfluencies can influence the accuracy of transcripts, as well as the ability to properly align transcripts with audio content. The most common speech disfluencies are non-lexical utterances that are referred to as "filler words." Examples of filler words include "huh," "uh," "erm," "um," "well," "so," "like," "hmm," "you know," "but you know," "you know what I mean," "I mean," "right," "you see," "I guess," "I suppose," "or something," "sort of," and "kind of." Accordingly, the term "filler word" may cover utterances with one or more words.

Figure 4:
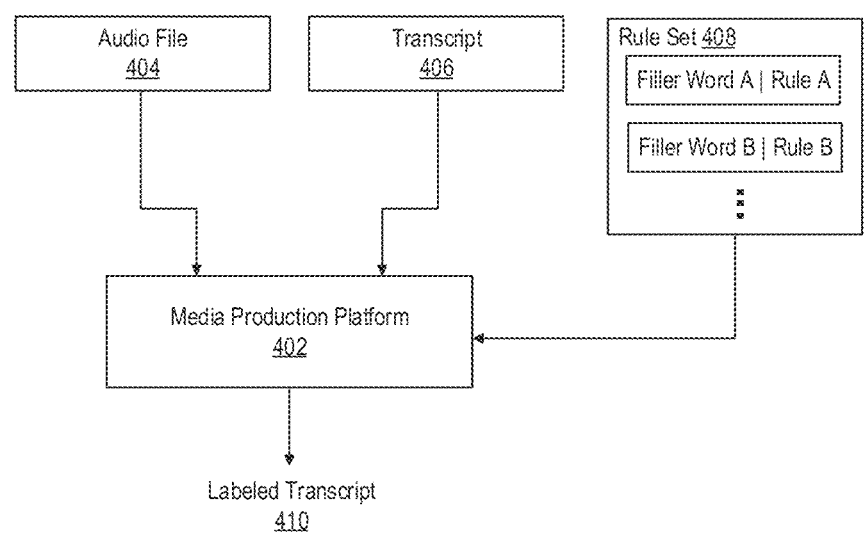
FIG. 4 depicts an example of a communication environment that includes a media production platform configured to identify the filler words in a transcript.

FIG. 4 includes a high-level representation of an environment 400 in which a media production platform 402 identifies the filler words in a transcript. Initially, an audio file 404 and corresponding transcript 406 can be obtained by the media production platform 402. As discussed above, in some embodiments, the media production platform 402 is configured to produce the transcript 406 by performing a speech-to-text operation on the audio file 404. In other embodiments, the transcript 406 may be acquired to the media production platform 402 from a database. The database may be managed by a developer or a third-party service that provides transcription services. In embodiments where the database is managed by a third-party service (also referred to as a "transcription service"), the media production platform 402 may communicate with the transcription service via an API. Thus, the media production platform 402 may submit a request for a transcript by forwarding the audio file 404 to the transcription service via the API.

The media production platform 402 can tokenize the transcript 406 and then label each token using an NLP library. In particular, the media production platform 402 may employ part-of-speech tagging and/or dependency parsing, among other things, to assign one or more labels to each token that is representative of a word. Part-of-speech tagging (also referred to as "grammatical tagging") is a process by which the media production platform 402 labels each word in a corpus (e.g., a transcript) as corresponding to a particular part of speech based on its definition and context. Some embodiments rely on simple labels such as noun, verb, adjective, conjunction, and the like, while other embodiments rely on more fine-grained labels such as noun-singular, noun-plural, verb-present, and verb-past. The term "label," as used herein, is synonymous with the term "tag." A token representative of a word can be represented using a tuple that comprises the word and corresponding label. Meanwhile, dependency parsing is a process by which the media production platform 402 extracts a dependency parse of a sentence in a corpus (e.g., a transcript) and then represents its grammatical structure by defining the relationships between "head" words and other words (referred to as "dependent words") that modify those head words. In embodiments where dependency parsing is performed, the media production platform 402 establishes the relation among the words in each sentence, for example, with directed, labeled arcs from head words to dependent words. Examples of labels include "nsubj" for subject noun, "dobj" for direct object, "prep" for prepositional modifier, and "pobj" for object of preposition. Thus, the media production platform 402 may produce a dependency structure indicative of the dependency analysis performed for each sentence.

Then, the media production platform 402 can access a set of rules 408 associated with different filler words. Each rule may be designed to identify instances of a particular filler word. Said another way, each rule may be specific to a filler word, and thus will indicate whether or not a token corresponds to that filler word. At a high level, the rules may examine the text content (and associated tokens/labels) to determine whether patterns, relationships (e.g., dependency), verbatim, and context indicate that a term is a filler word.

Thus, if the media production platform 402 is interested in identifying instances of a given filler word, then the media production platform 402 may apply the corresponding rule in the set 408 to the tokens representative of the transcript 406. However, if the media production platform 402 is interested in identifying instances of multiple filler words, then the media production platform 402 may apply multiple rules in the set 408 to the tokens representative of the transcript 406. Since each rule operates independent of the others, these rules may be applied sequentially or simultaneously by the media production platform 402. The multiple rules may be associated with different filler words, or the multiple rules may be associated with the same filler word. As an example, multiple rules (with different criteria) may be programmed to discover instances of a single filler word in different contexts.

Any filler words that are discovered in the transcript 406 can be identified as such by the media production platform 402 so that appropriate action(s) can be taken. For example, the media production platform 402 may produce a labeled transcript 410 in which the filler words are labeled in some manner. For example, each filler word may be visually highlighted by being rendered in a different color, underlined, bolded, etc. Note that different filler words could be visually highlighted in different manners. For example, each filler word may be associated with highlighting of a different color. As another example, filler words that could be used in legitimate contexts may be rendered in a different color than purely non-lexical utterances for easier review.

Figure 5:
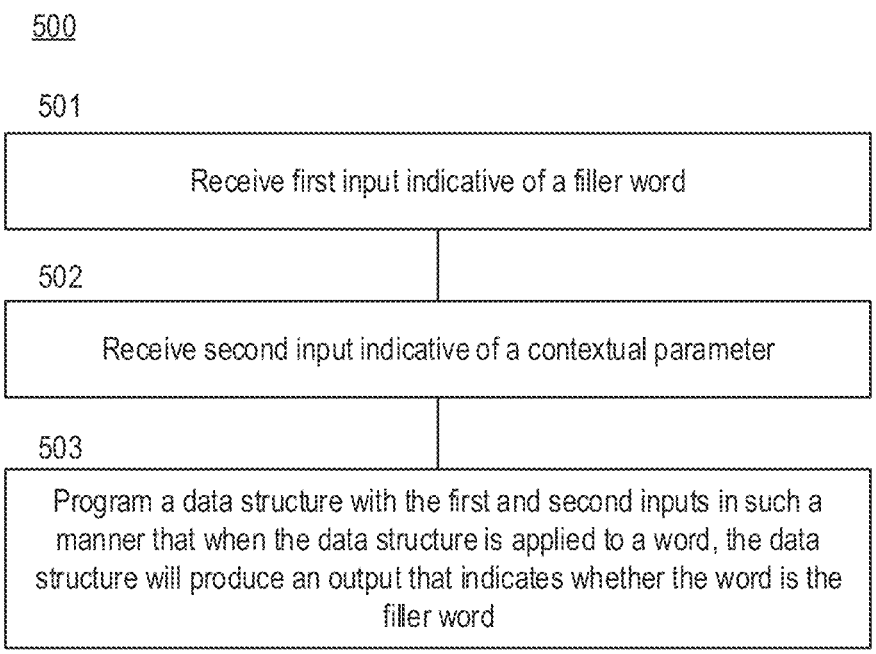
FIG. 5 depicts a flow diagram of a process for creating a rule that can be used to identify instances of a filler word.

FIG. 5 depicts a flow diagram of a process 500 for creating a rule that can be used to identify instances of a filler word. Initially, a media production platform may receive first input indicative of a filler word (step 501). For example, a developer may input the filler word through an interface generated by the media production platform. Said another way, the media production platform may generate an interface through which the first input is received.

Then, the media production platform may receive second input indicative of a contextual parameter (step 502). At a high level, the contextual parameter may be representative of the criterion that must be satisfied for the rule to indicate that an occurrence of the filler word is present. As an example, the contextual parameter may specify that the term "like" must be followed by some form of punctuation, or the contextual parameter may specify that a term must be either preceded or followed by another instance of the same term (referred to as a "repetition"). Thus, the media production platform may detect repetitive instances of a phrase comprised of one or more words. Some repetitions may be completely valid. As such, rules defined to discover repetitions should be defined and then employed with caution. Imagine, for instance, that the media production platform discovers the phrase "bye bye" or "I think my voice bothers some people; some people like it." These are examples of valid repetitions, and thus should not be flagged by the media production platform. As another example, the contextual parameter may specify that the term "know" must be preceded by the term "you" and followed by some form of punctuation. Thus, the second input may specify more than one contextual parameter. For instance, a first contextual parameter may specify that a first occurrence of a given phrase must be immediately followed by a second occurrence of the given phrase, while a second contextual parameter may specify that a certain form of punctuation must occur before the first occurrence, after the second occurrence, or between the first and second occurrences.

In some embodiments, these contextual parameters are manually input by a developer. For example, a developer may define the content for when a word (or series of words) should be labeled as a filler word. In other embodiments, these rules are derived by the media production platform on behalf of the developer. For example, the media production platform could train a model to discover instances of a filler word based on training samples provided by a developer. Each training sample may include an instance of the filler word. From the training samples, the model may be able to derive contextual parameter(s) that can be used to identify instances of the filler word.

Thereafter, the media production platform can program a data structure with the first and second inputs in such a manner that when the data structure is applied to a word, the data structure will produce an output indicating whether the word is the filler word (step 503). This data structure may be representative of the rule that is defined for the filler word. In some embodiments, the media production platform may apply the data structure to tokens representative of words rather than the words themselves.

As discussed above, the media production platform will often apply multiple rules (and thus multiple data structures) to identify filler words in a transcript. For example, the media production platform could apply multiple rules designed to detect instances of the same filler word, or the media production platform could apply multiple rules designed to detect instances of different filler words.

In some situations, word(s) in the transcript may cause multiple rules to return a positive result. As an example, if a transcript includes the phrase "you know what I mean," a first rule designed to identify instances of "you know" and a second rule designed to identify instances of "you know what I mean" may both return positive results. To address this situation, the data structures can be programmed so that whichever rule is associated with the longest string of words is considered the appropriate match. In this example, the media production platform would mark the phrase as representative of an occurrence of "you know what I mean." Generally, the data structures are designed such that each word is either recognized as being representative of a single filler word or not representative of any filler words; that is, the media production platform may be designed so that a single word cannot be identified as representative of multiple filler words.

Figure 6:
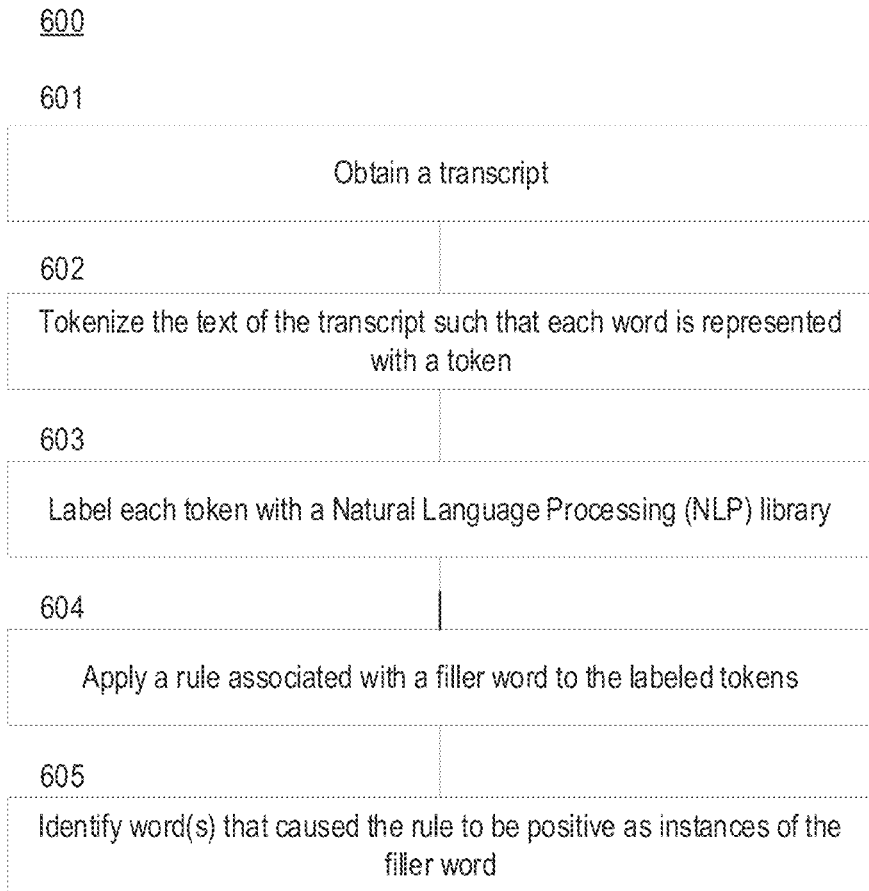
FIG. 6 depicts a flow diagram of a process for applying a rule to a transcript to detect instances of a filler word.

FIG. 6 depicts a flow diagram of a process 600 for applying a rule to a transcript to detect instances of a filler word. Initially, a media production platform will obtain a transcript (step 601). As discussed above with reference to FIG. 4, the transcript will normally be associated with one or more audio files, though this need not necessarily be the case. Then, the media production platform can tokenize the text of the transcript such that each word is represented with a token (step 602). The term "tokenize" refers to the process by which text (e.g., in the form of a transcript) is split into a series of tokens. Assume, for example, that the media production platform is tasked with tokenizing the following sentence: "Hello, my name is John Smith." In such a scenario, the media production platform may output separate tokens for the terms "hello," "my," "name," "is," "John," and "Smith," arranged in sequential order while discarding the punctuation. The media production platform may represent these tokens in Extensible Markup Language (XML) or as an s-expression. At a high level, the term "token" refers to a sequence of characters that are grouped together as a useful semantic unit for further processing. Tokenization is a language-specific task. As such, the media production platform may examine the transcript to determine the language prior to identifying an appropriate tokenization scheme. For example, before tokenizing the transcript, the media production platform may perform language identification based on classifiers that use short-character subsequences as features. Language identification may be performed to confirm that the transcript is in a default language (e.g., English) for which tokenization is possible. Following tokenization, the tokens may be loaded into data structure(s) for further processing.

The media production platform can label each token with an NLP library (step 603). One example of an NLP library is spaCy. Such an approach may cause each token to be associated with contextual information. Thus, the data structure(s) into which the tokens have been loaded may be populated with information regarding part of speech, dependency, and the like. Then, the media production platform can apply a rule to the labeled tokens (step 604). As noted above, the rule may be one of multiple rules that are applied to the labeled tokens by the media production platform. Generally, each rule is independently applied to each token to determine whether the corresponding word is representative of the filler word with which the rule is associated, though the rule may be able to observe the context of the token (e.g., its surrounding words).

Each rule can be implemented as a function that takes two arguments: (i) the labeled tokens representing the entire transcript and (ii) the positional index of a given labeled token. As output, each rule will indicate whether any labeled tokens were determined to be instances of the corresponding filler word. More specifically, each rule can return either (i) a zero response indicating that none of the labeled tokens were determined to be instances of the corresponding filler word or (ii) an interval of two integer indices. These two integer indicates may specify the labeled token that represents the start of the filler word and the labeled token that represents the end of the filler word. The media production platform can save these two integer indices and the filler word corresponding to this interval of labeled token(s). Note that the two integer indices may include punctuation and/or spaces, so the labeled token(s) may not necessarily correspond to the canonical filler word. As an example, the media production platform may discover the phrase ", you know," even though the rule is associated with "you know.:

Generally, each rule is comprised of a sequence of patterns. The term "pattern," as used herein, refers to a function that takes the two arguments mentioned above as input while returning either true or false as output. If a pattern is not matched, then the rule may result false as output. However, if a pattern is matched, the media production platform may proceed to the next pattern. One example of a pattern is "seq[i−1].pos_not in ["VERB", "AUX", "PART", "SCONJ"]." In this example, the pattern specifies that previous token should not be a verb, auxiliary, particle, or subordinating conjunction. If enough patterns are matches, the rule can output the interval of labeled tokens as discussed above. An example of a rule for the phrase "I mean" is provided below:

```
def i_mean(i, seq):
    pat = (seq[i].lower_ == "i") and (i+2 < len(seq))
    if not pat:
        return
    if i-1 >= 0:
        pat = seq[i-1].pos_ ! = "PRON"
        if not pat:
            return
    pat = seq[i+2].pos_ not in ["PRON", "VERB", "ADP", "AUX", "SCONJ"]
    if not pat:
        return
    return i, i+2
```

This tailored approach to rulemaking ensures that appropriate uses of the phrase "I mean" (e.g., "If you know what I mean," "I mean that," etc.) will not be identified as filler words.

If the media production platform discovers that a token caused the rule to be positive, the media production platform can identify the corresponding word as an instance of the filler word with which the rule is associated (step 605). For example, the media production platform may visually highlight the corresponding word within the transcript when shown on an interface. As another example, the media production platform may compile a summary that identifies all instances of the filler word and the positions of those instances in the transcript.

Unless contrary to physical possibility, it is envisioned that the steps described above may be performed in various sequences and combinations. For example, the media production platform may apply multiple rules associated with different filler words to labeled tokens representative of a transcript. Thus, the media production platform may sequentially or simultaneously execute multiple instances of process 600 of FIG. 6.

Other steps may also be included in some embodiments. As an example, the media production platform may automatically take remediation action(s) upon discovering filler words in some embodiments. For instance, upon discovering an instance of a filler word, the media production platform may be configured to delete the filler word from its transcript (which may prompt modification of a corresponding audio file as discussed above). Deletion is one example of a remediation action that may be performed by the media production platform responsive to a determination that an instance of a filler word was discovered. As discussed above, another example of a remediation action is visually distinguishing the filler word from other words in the transcript so as to allow an individual to easily spot and then address the issue. As another example, the media production platform may permit an individual to enable or disable rules associated with certain filler words. For instance, an individual may be able to specify that a given rule should not be applied if the individual determines that too many false positives have been flagged by the media production platform.

Figure 7:
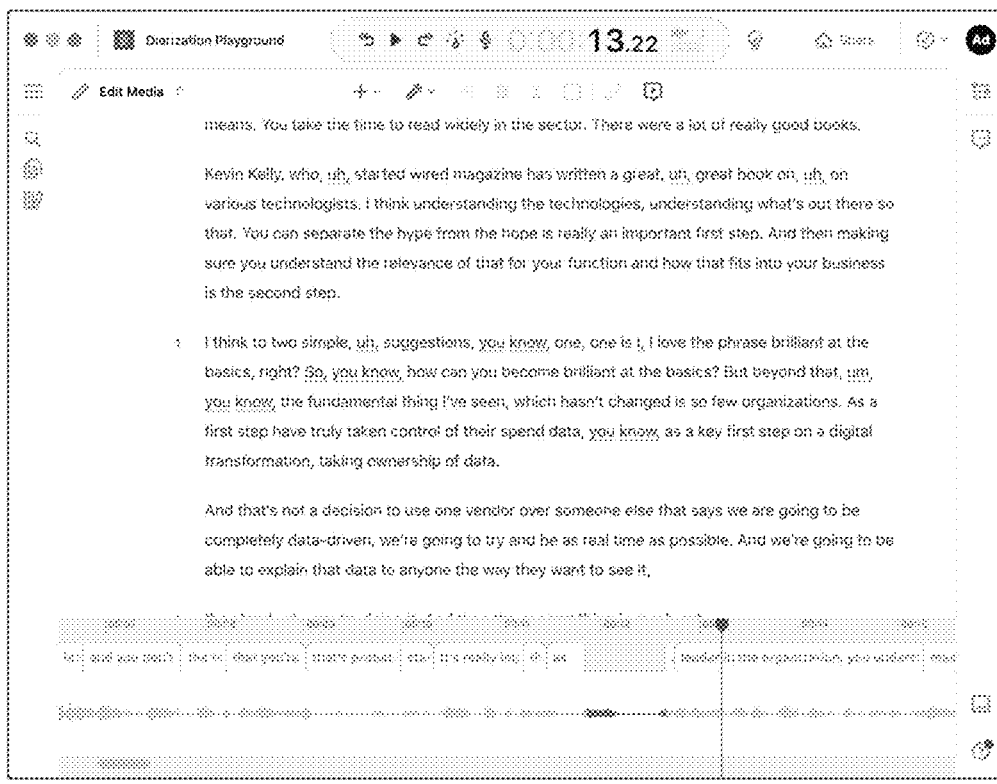
FIG. 7 depicts an example of an interface that includes a transcript.

FIG. 7 depicts an example of an interface that includes a transcript. An individual may be permitted to upload an audio file to be transcribed through the interface as discussed above. Upon receiving input indicative of an audio file, the media production platform can produce a transcript by transcribing the audio file. Alternatively, the individual may be able to upload the transcript itself. As shown in FIG. 7, each word included in the transcript may be associated with a corresponding portion of the audio file so as to enable easy modification. As an example, if the individual is interested in deleting one or more words in the transcript (e.g., the phrase "no, no, no"), the individual may simply indicate as much by interacting with those word(s) in the word bar located along the bottom of the interface. As discussed above, the media production platform can then make appropriate adjustments to the underlying audio file (e.g., by deleting the portion in which those word(s) are uttered).

Then, the presence of filler words can be discovered by applying, either simultaneously or sequentially, a set of rules associated with different filler words. Each filler word discovered by the media production platform may be visually highlighted in some manner. Said another way, the transcript may be presented on the interface in such a manner that the filler words are distinguishable from the other words in the transcript. Here, the filler words have been underlined.

However, filler words could be rendered in a different color, highlighted, bolded, italicized, or any combination thereof.

Processing System

Figure 8:
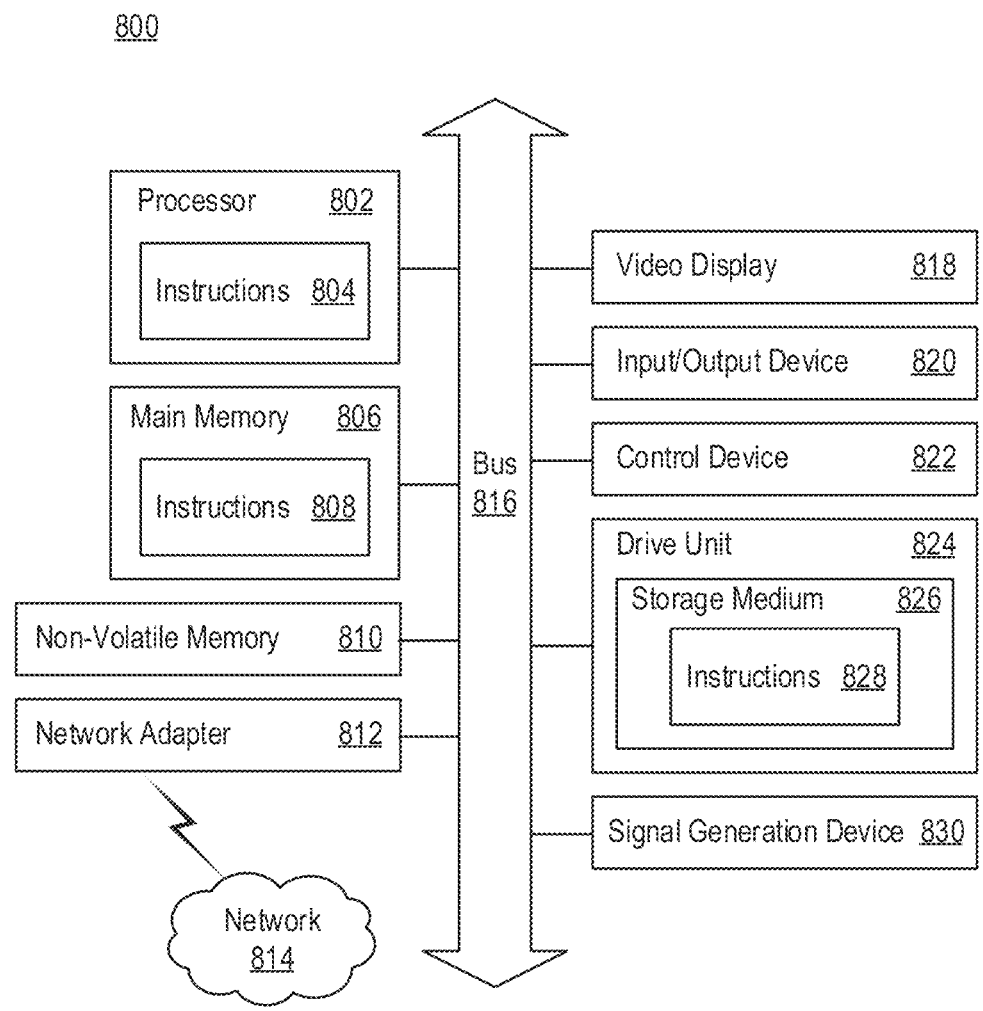
FIG. 8 is a block diagram illustrating an example of a processing system in which at least some operations described herein can be implemented.

FIG. 8 is a block diagram illustrating an example of a processing system 800 in which at least some operations described herein can be implemented. For example, some components of the processing system 800 may be hosted on computing device that includes a media production platform (e.g., media production platform 102 of FIG. 1, media production platform 210 of FIG. 2, or media production platform 402 of FIG. 4).

The processing system 800 may include a processor 802, main memory 806, non-volatile memory 810, network adapter 812 (e.g., a network interface), video display 818, input/output device 820, control device 822 (e.g., a keyboard, pointing device, or mechanical input such as a button), drive unit 824 that includes a storage medium 826, or signal generation device 830 that are communicatively connected to a bus 816. The bus 816 is illustrated as an abstraction that represents one or more physical buses and/or point-to-point connections that are connected by appropriate bridges, adapters, or controllers. The bus 816, therefore, can include a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit ($I^2C$) bus, or a bus compliant with Institute of Electrical and Electronics Engineers (IEEE) Standard 1394.

The processing system 800 may share a similar computer processor architecture as that of a computer server, router, desktop computer, tablet computer, mobile phone, video game console, wearable electronic device (e.g., a watch or fitness tracker), network-connected ("smart") device (e.g., a television or home assistant device), augmented or virtual reality system (e.g., a head-mounted display), or another electronic device capable of executing a set of instructions (sequential or otherwise) that specify action(s) to be taken by the processing system 800.

While the main memory 806, non-volatile memory 810, and storage medium 826 are shown to be a single medium, the terms "storage medium" and "machine-readable medium" should be taken to include a single medium or multiple media that stores one or more sets of instructions 826. The terms "storage medium" and "machine-readable medium" should also be taken to include any medium that is capable of storing, encoding, or carrying a set of instructions for execution by the processing system 800.

In general, the routines executed to implement the embodiments of the present disclosure may be implemented as part of an operating system or a specific application, component, program, object, module, or sequence of instructions (collectively referred to as "computer programs"). The computer programs typically comprise one or more instructions (e.g., instructions 804, 808, 828) set at various times in various memories and storage devices in a computing device. When read and executed by the processor 802, the instructions cause the processing system 800 to perform operations to execute various aspects of the present disclosure.

While embodiments have been described in the context of fully functioning computing devices, those skilled in the art will appreciate that the various embodiments are capable of being distributed as a program product in a variety of forms. The present disclosure applies regardless of the particular type of machine- or computer-readable medium used to actually cause the distribution. Further examples of machine- and computer-readable media include recordable-type media such as volatile and non-volatile memory devices 810, removable disks, hard disk drives, optical disks (e.g., Compact Disk Read-Only Memory (CD-ROMS) and Digital Versatile Disks (DVDs)), cloud-based storage, and transmission-type media such as digital and analog communication links.

The network adapter 812 enables the processing system 800 to mediate data in a network 814 with an entity that is external to the processing system 800 through any communication protocol supported by the processing system 800 and the external entity. The network adapter 812 can include a network adaptor card, a wireless network interface card, a switch, a protocol converter, a gateway, a bridge, a hub, a receiver, a repeater, or a transceiver that includes an integrated circuit (e.g., enabling communication over Bluetooth or Wi-Fi).

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method performed by a media production platform executing on a computing device, the method comprising:
obtaining multiple samples to be used to train a model to identify instances of a filler word,
wherein each of the multiple samples includes an instance of the filler word;
providing the multiple samples to the trained model as input, such that the trained model derives, based on an analysis of the multiple samples, a contextual parameter that is representative of a rule for identifying instances of the filler word;

receiving input indicative of a selection of an audio file made through an interface;

forwarding the audio file to an application programming interface for transcription by a transcription service;

obtaining, via the application programming interface, a transcript that comprises a series of words arranged in sequential order as uttered in the audio file;

tokenizing each word in the transcript as a separate token so as to create a series of tokens arranged in sequential order;

labeling the series of tokens with a Natural Language Processing (NLP) library;

applying the trained model to the labeled series of tokens, wherein the trained model takes, as input, (i) the labeled series of tokens and (ii) positional indexes of the labeled series of tokens; and identifying, based on an output produced by the trained model, a word in the transcript that is representative of an instance of the filler word.

2. The method of claim 1, further comprising:
causing display of the transcript on an interface;
wherein said identifying comprises visually distinguishing the word from other words in the transcript.

3. The method of claim 1, wherein the trained model is one of multiple trained models applied to the labeled series of tokens by the media production platform, and wherein the multiple rules are associated with multiple filler words.

4. The method of claim 3, wherein the multiple trained models are applied simultaneously so as to concurrently determine whether the word represents an instance of any of the multiple filler words.

5. The method of claim 3, wherein each of the multiple trained models is associated with a different filler word.

6. The method of claim 3, wherein at least two of the multiple trained models are associated with a single filler word.

7. The method of claim 1, wherein the output is representative of a two-integer index, wherein a first integer specifies a first labeled token that represents a start of the filler word, and wherein a second integer specifies a second labeled token that represents an end of the filler word.

8. A non-transitory computer-readable medium with instructions stored thereon that, when executed by a processor of a computing device, cause the computing device to perform operations comprising:

receiving input indicative of a selection of an audio file through an interface;

retrieving, in response to said receiving, the audio file from a storage medium;

forwarding the audio file to a transcription service via an application programming interface;

obtaining the transcript from the transcription service via the application programming interface;

tokenizing each word in the transcript as a separate token so as to create a series of tokens in temporal order;

labeling the series of tokens with a Natural Language Processing (NLP) library;

discovering at least one filler word in the transcript by applying at least two rules to the labeled series of tokens, wherein each of the at least two rules is associated with a corresponding filler word, wherein each of the at least two rules is based on a contextual parameter of the corresponding filler word that is learned by a trained model through analysis of samples that include the corresponding filler word, wherein each of the at least two rules takes, as input, (i) the labeled series of tokens and (ii) positional indexes of the labeled series of tokens, and wherein each of the at least two rules produces, as output, either (i) a zero response that indicates no tokens were determined to be representative of the corresponding filler word or (ii) an integer index that identifies locations of tokens, if any, determined to be representative of the corresponding filler word; and causing display of the transcript on the interface in such manner that the at least one filler word is visually distinguishable from other words in the transcript.

9. The non-transitory computer-readable medium of claim 8, wherein said labeling comprises employing part-of-speech tagging to assign a separate label to each of the series of tokens.

10. The non-transitory computer-readable medium of claim 8, wherein said labeling comprises employing labeled dependency parsing to assign a separate label to each of the series of tokens.

11. The non-transitory computer-readable medium of claim 8, wherein the at least two rules are applied simultaneously so as to concurrently determine whether each token represents an instance of any of the filler words associated with the at least two rules.

12. The non-transitory computer-readable medium of claim 8, wherein the storage medium is accessible to the computing device across a network.

13. The non-transitory computer-readable medium of claim 8, wherein each rule is represented as a data structure that specifies (i) the corresponding filler word and (ii) the contextual parameter that is indicative of a criterion that must be satisfied for the rule to indicate that a given labeled token represents an instance of the corresponding filler word.

14. The non-transitory computer-readable medium of claim 8, wherein for each token determined to be representative of a filler word, the corresponding integer index specifies an interval defined by (i) a first positional index that corresponds to a start of the filler word and (ii) a second positional index that corresponds to an end of the filler word.

* * * * *